United States Patent [19]
Miller et al.

[11] Patent Number: 5,278,359
[45] Date of Patent: Jan. 11, 1994

[54] SIMPLE MULTISHOT DOWNHOLE EXPLOSIVE TOOL

[75] Inventors: Mark A. Miller; John T. Evans, both of Houston, Tex.

[73] Assignee: Exxon Production Research Company, Houston, Tex.

[21] Appl. No.: 876,842

[22] Filed: Apr. 30, 1992

[51] Int. Cl.$^5$ .................... G01V 1/06; G01V 1/40
[52] U.S. Cl. .................... 181/106; 181/116; 175/4.55
[58] Field of Search ............. 181/106, 116; 367/145; 175/4.55

[56] References Cited

U.S. PATENT DOCUMENTS

| | | | |
|---|---|---|---|
| 4,208,966 | 6/1980 | Hart | 175/4.55 |
| 4,433,476 | 2/1984 | Bailey et al. | 29/752 |
| 4,895,218 | 1/1990 | Chen et al. | 175/4.55 |

Primary Examiner—Ian J. Lobo
Attorney, Agent, or Firm—Susan A. McLean; Darcell Walker

[57] ABSTRACT

A downhole seismic acoustical signal source capable of selectively firing numerous, prewired explosive charges. The downhole seismic source has a firing system that uses a sequence of combinations of two conductors at a time and a downhole diode array to select and fire a single charge. The conductors are connected to a Surface Control Unit at the surface. A seismic crew on the surface can select and fire any charge through this control unit. The downhole seismic source has the ability to fire numerous explosive charges in a given downhole trip through the firing of many individual explosive charges.

19 Claims, 4 Drawing Sheets

14 SHOT WIRE PAIR TABLE

|     | 2.1 | 3.1 | 4.1 | 5.1 | 6.1 | 7.1 | 8.1 |
|-----|-----|-----|-----|-----|-----|-----|-----|
| 1.2 | *.* | 3.2 | 4.2 | 5.2 | 6.2 | 7.2 | 8.2 |
| 1.3 | 2.3 | *.* | 4.3 | 5.3 | 6.3 | 7.3 | 8.3 |
| 1.4 | 2.4 | 3.4 | *.* | 5.4 | 6.4 | 7.4 | 8.4 |
| 1.5 | 2.5 | 3.5 | 4.5 | *.* | 6.5 | 7.5 | 8.5 |
| 1.6 | 2.6 | 3.6 | 4.6 | 5.6 | *.* | 7.6 | 8.6 |
| 1.7 | 2.7 | 3.7 | 4.7 | 5.7 | 6.7 | *.* | 8.7 |
| 1.8 | 2.8 | 3.8 | 4.8 | 5.8 | 6.8 | 7.8 | *.* |

1-7 - Lines 1-7,  8 - Armor,  *.* - Invalid
28 Diodes

FIG. 4A

24 SHOT WIRE PAIR TABLE

|     | 2.1 | 3.1 | 4.1 | 5.1 | 6.1 | 7.1 | 8.1 |
|-----|-----|-----|-----|-----|-----|-----|-----|
| 1.2 | *.* | 3.2 | 4.2 | 5.2 | 6.2 | 7.2 | 8.2 |
| 1.3 | 2.3 | *.* | 4.3 | 5.3 | 6.3 | 7.3 | 8.3 |
| 1.4 | 2.4 | 3.4 | *.* | 5.4 | 6.4 | 7.4 | 8.4 |
| 1.5 | 2.5 | 3.5 | 4.5 | *.* | 6.5 | 7.5 | 8.5 |
| 1.6 | 2.6 | 3.6 | 4.6 | 5.6 | *.* | 7.6 | 8.6 |
| 1.7 | 2.7 | 3.7 | 4.7 | 5.7 | 6.7 | *.* | 8.7 |
| 1.8 | 2.8 | 3.8 | 4.8 | 5.8 | 6.8 | 7.8 | *.* |

1-7 - Lines 1-7,  8 - Armor,  *.* - Invalid
24 Diodes

FIG. 4B

30 SHOT WIRE PAIR TABLE

|     | 2.1 | 3.1 | 4.1 | 5.1 | 6.1 | 7.1 | 8.1 |
|-----|-----|-----|-----|-----|-----|-----|-----|
| 1.2 | *.* | 3.2 | 4.2 | 5.2 | 6.2 | 7.2 | 8.2 |
| 1.3 | 2.3 | *.* | 4.3 | 5.3 | 6.3 | 7.3 | 8.3 |
| 1.4 | 2.4 | 3.4 | *.* | 5.4 | 6.4 | 7.4 | 8.4 |
| 1.5 | 2.5 | 3.5 | 4.5 | *.* | 6.5 | 7.5 | 8.5 |
| 1.6 | 2.7 | 3.6 | 4.6 | 5.6 | *.* | 7.6 | 8.6 |
| 1.7 | 2.6 | 3.7 | 4.7 | 5.7 | 6.7 | *.* | 8.7 |
| 1.8 | 2.8 | 3.8 | 4.8 | 5.8 | 6.8 | 7.8 | *.* |

1-7 - Lines 1-7,  8 - Armor,  *.* - Invalid
20 Diodes

FIG. 4C

56 SHOT WIRE PAIR TABLE

|     | 2.1 | 3.1 | 4.1 | 5.1 | 6.1 | 7.1 | 8.1 |
|-----|-----|-----|-----|-----|-----|-----|-----|
| 1.2 | *.* | 3.2 | 4.2 | 5.2 | 6.2 | 7.2 | 8.2 |
| 1.3 | 2.3 | *.* | 4.3 | 5.3 | 6.3 | 7.3 | 8.3 |
| 1.4 | 2.4 | 3.4 | *.* | 5.4 | 6.4 | 7.4 | 8.4 |
| 1.5 | 2.5 | 3.5 | 4.5 | *.* | 6.5 | 7.5 | 8.5 |
| 1.6 | 2.6 | 3.6 | 4.6 | 5.6 | *.* | 7.6 | 8.6 |
| 1.7 | 2.7 | 3.7 | 4.7 | 5.7 | 6.7 | *.* | 8.7 |
| 1.8 | 2.8 | 3.8 | 4.8 | 5.8 | 6.8 | 7.8 | *.* |

1-7 - Lines 1-7,  8 - Armor,  *.* - Invalid
112 Diodes

FIG. 4D

SIMPLE MULTISHOT DOWNHOLE EXPLOSIVE TOOL

FIELD OF THE INVENTION

The present invention relates to the use of a downhole seismic source capable of producing seismic waves through multiple explosives for use in reverse Vertical Seismic Profiling and cross-hole Seismology.

BACKGROUND OF THE INVENTION

In geophysical prospecting, seismic operations are frequently used to generate, collect, and analyze Q information about subsurface formations. These operations are usually performed by initiating seismic waves or acoustic signals that travel downward into the earth until they encounter discontinuities in the earth's structure in the form of varying subsurface strata formations. Such discontinuities reflect at least part of the acoustical signals back toward the earths surface. In oil and gas explanation operations, these reflected acoustical signals are recorded and studied to help locate and analyze various subsurface formation for potential oil and gas production.

In oil and gas operations, seismic energy sources such as dynamite or blasting caps are frequently used to generate acoustic signals. In addition, sources such as vibrators or thumpers are used to generate the acoustic signals.

One variation of the typical seismic exploration method is called Vertical Seismic Profiling ("VSP"). VSP is known to be valuable in structural and stratigraphic interpretation of subsurface formations and geological prospecting for oil and gas. In VSP, a geophone or other type of acoustic detector is lowered into a borehole. Acoustic signals are then generated at various ground surface locations away from the borehole. Recordings are made through the geophones at various levels in the borehole.

In VSP, the acoustical signals travel from the signal source through the near ground surface only once on their way to the geophone in the borehole. This results in less attenuation of high frequency waves than occurs for typical surface seismic operations when signals must travel through the near ground surface twice. These higher frequencies give VSP better resolution than surface seismic methods.

A disadvantage of VSP is that numerous offset energy source locations are required to obtain the amount of seismic information necessary to properly study a given subsurface formation. Placement of these offset energy sources is time consuming and expensive. Often the placement of the seismic energy sources, such as dynamite, blasting caps, or large vibrators or thumpers, at a desired location is difficult. Seismic sources must be kept some distances from buildings, dwellings, roads and other structures that would be affected by blasting or the use of dynamite. Also roads to isolated exploration areas may not allow for transporting large pieces of seismic equipment to required locations.

In order to obtain the benefits of VSP in areas where using a seismic source to create acoustical signals from a surface location may be difficult, a modified VSP method referred to as reversed VSP, is used. In reverse VSP, a seismic source is placed in the borehole and geophones or other types of acoustical detectors are laid out on the surrounding ground surface. The surface receivers can be located in positions that would not permit the use of dynamite that are inaccessible to seismic sources such as large vibrators. In addition to being useful in places conventional VSP cannot be used, reversed VSP is capable of obtaining higher quality data than conventional VSP. In reversed VSP operations, receivers can be buried in complicated arrays which improve the frequency content of the reflected signals and reduce noise in the reflected signals. Accordingly, higher frequency and more consistent data can be recorded with reversed VSP than with conventional VSP. The most significant advantage of reverse VSP is that a single downhole seismic source, if used with a large number of geophones at the ground surface, can generate data equivalent to many standard VSP operations with various offsets.

A seismic operation similar to reverse VSP is cross-hole seismology. In cross-hole seismology, a seismic source is lowered into one borehole and a geophone is lowered into a second borehole. The seismic source creates acoustical signals that travel from the first borehole to the second borehole where the signals are measured and recorded. Cross-hole seismology does not require the laying out of surface geophones as is required in reversed VSP. Because the acoustical signals do not have to travel through the near ground surface, seismic data is produced having high resolution and a high signal-to-noise ratio. Cross-hole seismology is most generally used in producing fields, where existing boreholes may be used to provide additional information about previously discovered reservoirs.

Various downhole energy sources are available for use in reversed VSP and cross-hole seismology. As stated previously some of the methods for generating acoustical signals include the use of explosive blasting caps, sidewall coring guns, and perforating guns. Although these methods could provide an energy source of acceptable intensity for generating acoustic signals, a blasting cap allows only a single explosion for each downhole trip and sidewall coring and perforating guns may damage the casing of the borehole. Currently, individual explosive charges or series of explosive charges without the damaging effects of the above mentioned guns are frequently used. These charges are electrically detonated from the ground surface by a seismic crew through a standard seven conductor wireline cable. However, the use of a standard wireline cable, limits the number of individual explosions available to be fired on a single downhole trip with a downhole source.

Another downhole seismic source currently used is an air gun. An advantage of an air gun is that it may be moved up and down the borehole and repeatedly fired at various positions on a single downhole trip. However, an air gun has mechanical limitations and use restrictions that can make its operation and handling difficult. The firing control line and high pressure air hose are very bulky and can be difficult to operate in a deep borehole. In addition, a downhole air gun usually produces less acoustical energy than a 10 gram explosive charge of a standard pentaerythritol tetranitrate (PETN) explosive. Because of this relatively weak energy source level, air guns are usually used only for cross-hole seismology but not for reversed VSP.

Another disadvantage of using an air gun is that air guns produce more tube-wave energy in the borehole than do other explosives. Existence of such tube waves complicates data processing and interpretation of the recorded data. Additionally, air bubbles are produced during operation of an air gun which change the acoustical properties of the mud column, which complicates signal processing.

Finally, an air gun's performance may be adversely affected by large hydrostatic pressures such as when the gun is operated at significant depths.

The downhole energy source that generates the most desirable acoustical signals is an explosive charge, such as is obtained in firing a sidewall coring gun or perforating gun. Explosive shot arrangements without the damaging effects of coring guns or perforating guns are commercially available. The firing of these explosive shot arrangements can be controlled at the ground surface through standard seven conductor wireline cable. A limitation in using standard surface firing control equipment with a standard seven conductor cable is that a maximum of 14 individual or group shots can be fired before a downhole firing arrangement must be removed from the borehole and reloaded. The reason for this limitation is that present methods use the seven lines to carry current to the explosive and uses only the armor line as a return to complete the circuit that allows current to flow. This method is limited because each line can have only one positive or negative signal. With seven lines, there are possibilities for current flow to generate only 14 signals. Therefore, using only the armor line as stated above only 14 explosives can be fired. Since in typical reversed VSP and cross-hole seismology operations, the firing of hundreds or thousands of shots might be required to generate the necessary amount of seismic information, a downhole firing apparatus using a standard surface firing control arrangement would require many downhole trips. Such numerous trips are time consuming, expensive, and prevent quick gathering of large amounts of data.

U.S. Pat. No. 4,895,218 (Chen et al.) addresses many of the above mentioned problems by providing a downhole seismic source capable of selectively firing numerous explosives in a downhole arrangement to produce seismic waves in a subsurface formation. The downhole source is capable of firing numerous prewired explosive charges. The downhole source uses a self-contained firing circuit that receives select signals and fire signals from a seismic crew at the ground surface through a standard seven conductor wireline cable to detonate the explosive charges. The downhole seismic source is capable of generating numerous signals in a given downhole trip through the firing of many individual explosive charges. However, this device requires complex equipment in order to operate. There exist a need for a simple and safe way of individually firing more than 14 small (typically 7 gram) explosives in a borehole via a standard seven conductor wireline. The principal application of these small explosives would be as an effective downhole acoustic source for borehole geophysics.

SUMMARY OF THE INVENTION

The present invention is directed to a downhole seismic source capable of selectively firing numerous explosives (in excess of 14 explosives) in a downhole arrangement to produce seismic waves in a subsurface formation. The source can use the seven wires of the standard downhole cable as well as the armor as current carriers and returns. The downhole seismic source utilizes a plurality of explosive charges that can be fired from a surface location, a means for selecting a charge from the plurality of explosive charges, a means for regulating current flow and a protective housing. The source uses a sequence of combinations of two conductors at a time to select and fire a single explosive charge. The source enables the firing of greater than 14 shots in a sequential manner in a borehole without the need to bring the source out of the borehole before all shots are fired. This can occur by enabling any current carrying line to be driven positive with respect to any other line or to armor. One positive line can have seven different return lines. Therefore, one positive line can fire seven different charges. Depending on the topology of the current regulating means, the number of charges that can be fired from one positive current line can increase. The current regulating means restricts the current to the explosives to ensure that only the selected explosive is fired. The combined topology of the combinations of conductors and the downhole current regulating means determines the number of individual shots that can be controlled.

A surface control unit can be used as a means for selectively firing the plurality of explosive charges. This unit is comprised of a power supply with a plurality of switches, each such switch being wired through one of the seven conductor wires or armor to one of the downhole explosives. When the switch for a selected explosive is triggered, current will flow in the conductor pair that is connected to the explosive. Positive current flowing in the conductor pair will travel through the current regulator and will fire the explosive. The explosive will fire only when the positive current flows through the current regulator means connected to that explosive.

BRIEF DESCRIPTION OF THE FIGURES

FIGS. 4A–4D Various Topologies for simple Multishot downhole explosive tools.

DETAILED DESCRIPTION OF THE INVENTION

Extensive testing has shown that small electrically fired explosives in a borehole are an excellent broadband acoustic source for a variety of geophysical investigations. The present invention provides for the use of a sequence of combinations of two conductors at a time and a downhole diode array to select and fire a single explosive charge. The topology of these combinations determines the number of individual shots that can be controlled. FIG. 4A shows the topology used in the 14-shot combination. As is shown, line 8, the armor line is present in each combination. Table 1 shows the topology for use of a seven conductor wireline for a 32 shot combination.

TABLE 1

Topology for 32-Shot Source
Wire Pair Table

| *,* | 2,1 | 3,1 | 4,1 | 5,1 | 6,1 | 7,1 | 8,1 |
| 1,2 | *,* | 3,2 | 4,2 | 5,2 | 6,2 | 7,2 | 8,2 |
| 1,3 | 2,3 | *,* | 4,3 | 5,3 | 6,3 | 7,3 | 8,3 |
| 1,4 | 2,4 | 3,4 | *,* | 5,4 | 6,4 | 7,4 | 8,4 |

TABLE 1-continued
Topology for 32-Shot Source
Wire Pair Table

| 1, 5 | 2, 5 | 3, 5 | 4, 5 | *, * | 6, 5 | 7, 5 | 8, 5 |
| 1, 6 | 2, 6 | 3, 6 | 4, 6 | 5, 6 | *, * | 7, 6 | 8, 6 |
| 1, 7 | 2, 7 | 3, 7 | 4, 7 | 5, 7 | 6, 7 | *, * | 8, 7 |
| 1, 8 | 2, 8 | 3, 8 | 4, 8 | 5, 8 | 6, 8 | 7, 8 | *, * |

1-7 = Line 1-7, 8 = Armor, *, * Invalid
16 Diodes

A 32 shot version requires the simplest downhole diode array (16 diodes). The 42 and 56 shot combinations require a considerably more complex diode array (84 for 42 shots). FIGS. 4B, 4C and 4D show the topologies for additional combinations that can be used in multishot devices.

TABLE 2
Topology for 42-Shot Source
Wire Pair Table

| *, * | 2, 1 | 3, 1 | 4, 1 | 5, 1 | 6, 1 | 7, 1 | 8, 1 |
| 1, 2 | *, * | 3, 2 | 4, 2 | 5, 2 | 6, 2 | 7, 2 | 8, 2 |
| 1, 3 | 2, 3 | *, * | 4, 3 | 5, 3 | 6, 3 | 7, 3 | 8, 3 |
| 1, 4 | 2, 4 | 3, 4 | *, * | 5, 4 | 6, 4 | 7, 4 | 8, 4 |
| 1, 5 | 2, 5 | 3, 5 | 4, 5 | *, * | 6, 5 | 7, 5 | 8, 5 |
| 1, 6 | 2, 6 | 3, 6 | 4, 6 | 5, 6 | *, * | 7, 6 | 8, 6 |
| 1, 7 | 2, 7 | 3, 7 | 4, 7 | 5, 7 | 6, 7 | *, * | 8, 7 |
| 1, 8 | 2, 8 | 3, 8 | 4, 8 | 5, 8 | 6, 8 | 7, 8 | *, * |

1-7 = Line 1-7, 8 = Armor, *, * Invalid
84 Diodes

 Indicates wire pair used

Figure 2:
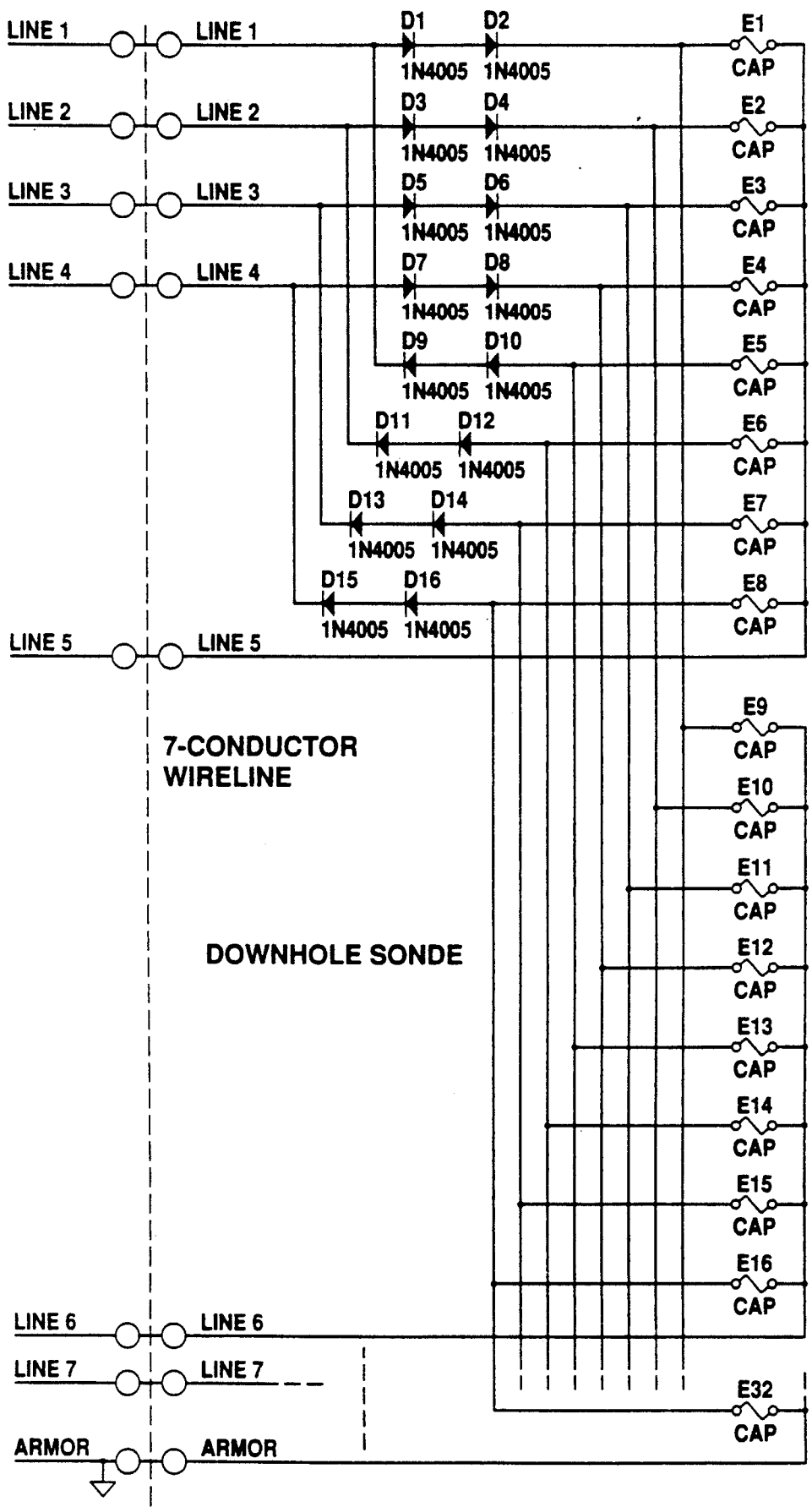
FIG. 2 Schematic of diode array connected to explosives and to seven conductor wireline.

FIG. 2 shows the 32 shot example in which four conductors are paired with four common conductors in 16 different ways. These 16 combinations are doubled by controlling the direction of the current. Current flowing in a wire pair in one direction will travel through a diode and fire a cap, and current flowing in the opposite direction will go through a different diode pair and fire a second cap. Two diodes are placed in series for safety reasons, because diodes typically fail shorted. FIG. 2 shows that the wire pairs and polarities can be selected by an array of momentary push-button switches in a Surface Control Unit. A current transformer is placed in series with one of the wire pairs to detect the cessation of current when an explosive shot 26 detonates. A logic trigger pulse is produced from the current pulse to turn on a recording system. A variable power transformer in the surface control unit is spring loaded to turn off when the operator releases it. A low-current ohm meter (not shown) is included in the Surface Control Unit for safely continuity testing each cap individually while the tool is downhole. The continuity testing feature is missing in the previously mentioned digital telemetry controlled shooting system.

Figure 1:
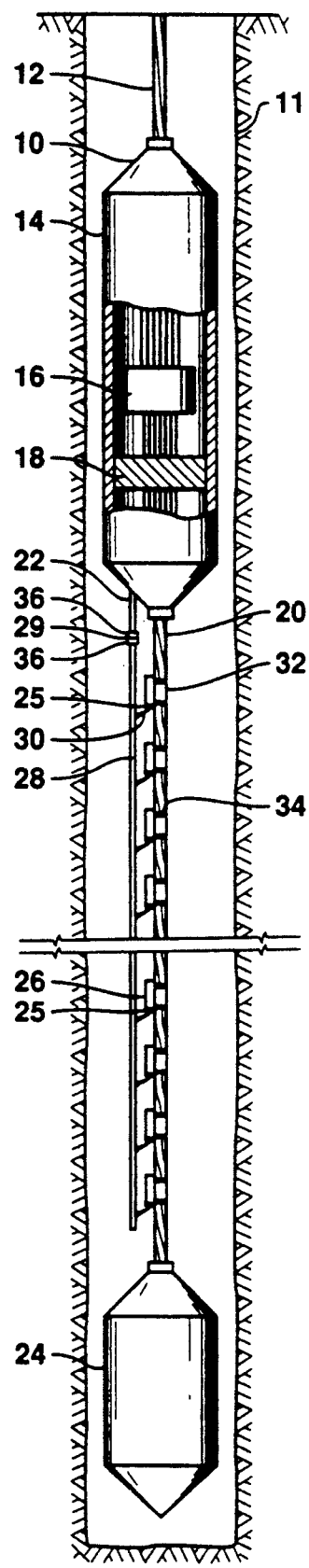
FIG. 1 Side view of one embodiment of the apparatus of this invention.

FIG. 1 shows the invention suspended in a borehole from the standard seven conductor cable wireline. Wireline 12 is attached to a protective housing 14 which contains the diode array 16. Protective housing 14 may be made of any material capable of withstanding pressure shocks caused by firing explosive shots 26 inside the borehole. In tests, the housing has been fabricated using stainless steel because of its high strength and corrosion resistance. Also enclosed in the housing 14 is a shock dissipator 18. The shock dissipator protects the diode array from shock waves generated by firing the explosive shots 26.

Extending out from the lower part of the protective housing 14 is support cable 20 and wire patch cable 22. Support cable 20 extends from below protective housing 14 to a sinker weight 24. The sinker weight 24 may be any standard weight device that allows support cable 2 to be fully extended below the protective housing 14. It is possible that the described downhole seismic source 10 could be modified so that sinker weight 24 would not be necessary. An alternative might include placing the protective housing 14 at the bottom of wireline 12 with explosive shots 26 connected to Wireline 12 above protective housing 14. If the protective housing is placed below the explosive shots, it would be necessary to further protect the wireline or other support arrangements from the potentially damaging effects of the explosive shot firings.

Wire patch cable 22 is a wire arrangement which provides an electrical control path from the diode array 16 to the blasting caps which detonate the individual explosive shots 26. The use of blasting caps for detonating explosive charges is widely known in the oil industry. The wiring from diode array 16 passes through wiring patch cable 22 and wiring harness 28 to blasting cap 25. Extending from wiring harness 28 is individual shot wiring 30.

Wiring harness 28 is a wire arrangement that provides an electrical circuit path between firing controls 16 and the individual blasting caps 25 in each explosive shot 26. Wiring harness 28 is connected to patch cable 22 through connectors 36. Wiring harness 28 may be allowed to hang freely along side cable 20 or may be secured to cable 20. Also, wiring harness 28 may be taped or tie wrapped to support cable 20. When loading explosive shots 26 to support cable 20 and wiring harness 28, shorting plug 29 can be inserted between connectors 36. Alternatively, wiring patch cables 22 at connectors 36 and shorting plug 29 may be inserted into the end of wiring harness 28 at connector 36. Shorting plug 29 will help prevent discharge of explosive shots 26 should an electrical current be accidentally introduced to the wiring harness.

The distance between individual explosive shots 26, which are attached to cable 20, depends on numerous factors, including the amount of the charge to be used and the borehole size and condition. Test results have shown that the separation between explosive shots 26 for a 10 gram charge of PETN (pentaerythritol tetranitrate) in six inch open borehole is about one foot.

Operation

Figure 3:
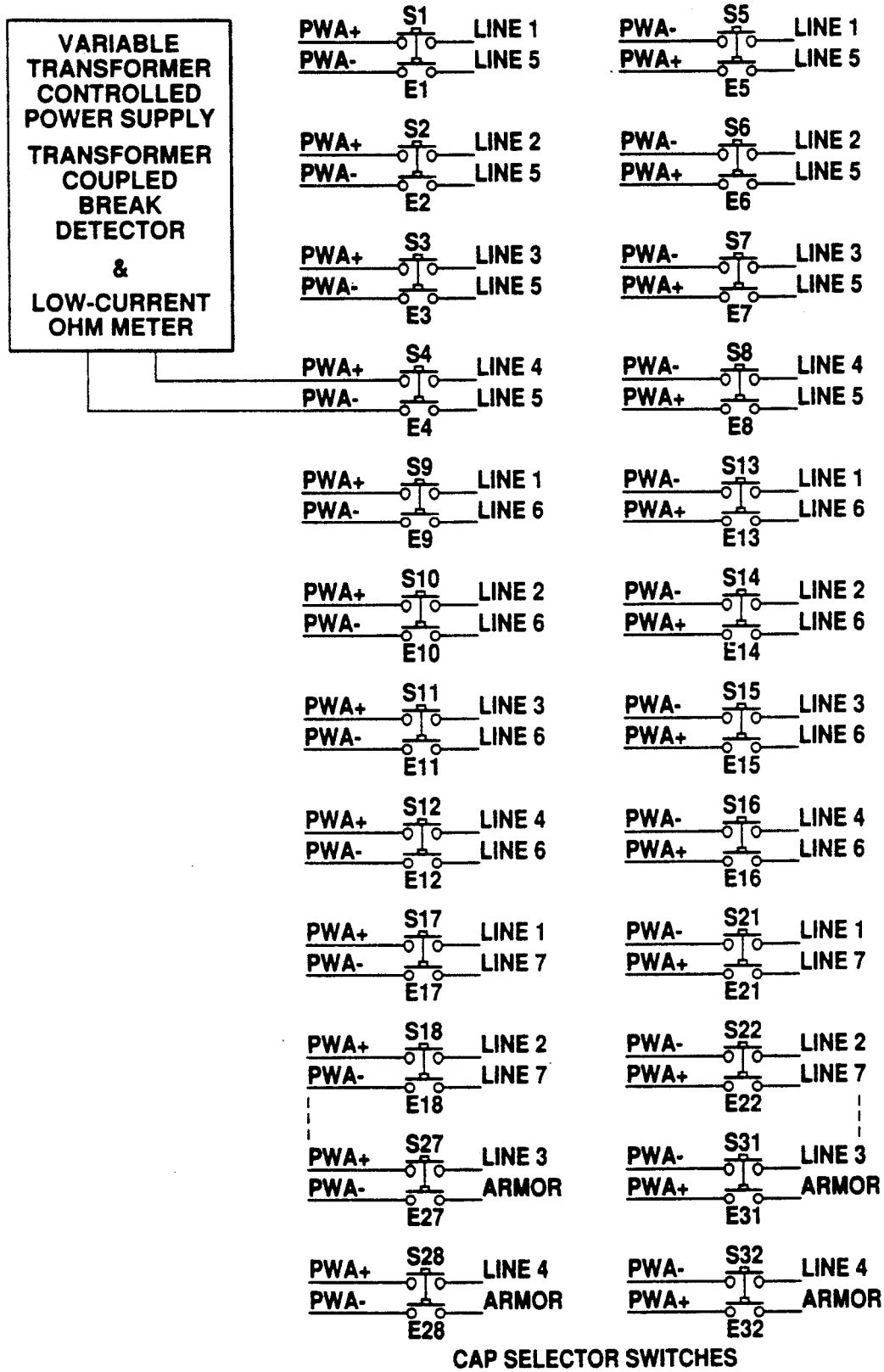
FIG. 3 Schematic of circuitry in the Surface Control Unit.

The operation of the present invention can be shown from FIGS. 3 and 2. In FIG. 3, the Surface Control Unit containing several switches is shown electrically connected to a power supply. The embodiment in FIGS. 3 and 2 is wired in a manner such that switches S4 corresponds to explosive cap E4 in FIG. 2. During the operation of this source, the operator will depress the switch corresponding to the shot the operator desires to fire. The operator will then activate the variable current source which will allow current to flow through the depressed switch to the desired shot. This two step procedure is desired in order to avoid accidentally depressing the wrong switch and firing the wrong shot. If the wrong shot is fired, all shots, below the fired shot, which have not been fired will be lost.

For example, when an operator depresses switch S4, circuits on lines 4 and 5 will be closed and current will begin to flow through those lines from the power supply. Positive current will flow through line 4 and negative current will flow from line 5. FIG. 2 shows the connection of the diode array with the conductor lines and with the explosives. As current from lines 4 and 5 reach Q the diode array, positive current will flow through the diode pair D7 and D8 in line 4 to the explosive E4 and on to line 5. This will cause E4 to detonate. Current from line 4 will be blocked from E8 by the diode pair D15 and D16. Negative current will be flowing through line 5, Which causes line 5 to behave as a return and complete the current flow path. A current limiting register (not shown) may be added in series with each diode pair to reduce the possibility of stray current accidentally detonating an explosive charge.

As apparent from the description of this invention, the diode array works very well and allows a simpler method of performing multishot downhole seismic surveying. However, logic gates and other digital circuitry can be used in arrangements that function in a manner to select one of many charges (one such example is circuitry similar to a multiplexer). Logic gates in combination with relay switches can also be used as a means to select one of the charges. Still another variation of this invention could be a transistor array used in place of the diode array.

The preferred embodiment of the present invention has been described herein. Because the operations that this invention performs can be implemented with a variety of electrical devices, this application does not describe each foreseeable manner of implementation. However, using standard electrical devices, one skilled in the art can design implementations of this invention not described in this application. Therefore it should be understood that the foregoing description is intended only to illustrate certain preferred embodiments of the invention an and is not intended to define the invention in any way. Other embodiments of the invention can be employed without departing from the full scope of the invention as set forth in the following claims.

What is claimed is:

1. An apparatus for generating a downhole seismic signal comprising:
    a) a switching means for selecting an explosive charge from a plurality of explosive charges;
    b) a means for regulating current flow to a plurality of explosive charges connected in a series electrical arrangement to the switching means;
    c) a cable to route current flow downhole, which cable contains a plurality of conductive paths, each path consisting of two wires which cable is connected to said switching means so that only one of said plurality of conductive paths is used for the selection of said explosive charge from a plurality of explosive charges: one wire being used to send the signal to said charge and the other of the two said wires being used to return the signal to close the circuit to the switching means;
    d) a plurality of explosive charges for generating a seismic signal connected in a series electrical arrangement to the current regulating means; and
    e) a protective housing in which the current regulating means is mounted.

2. The apparatus of claim 1 wherein the current flow regulating means is a diode array.

3. The apparatus of claim 1 wherein the current flow regulating means is a transistor array.

4. The apparatus of claim 1 wherein the switching means for selecting the explosive charge is a plurality of switches, each switch corresponding to an explosive charge.

5. The apparatus of claim 1 wherein the means for selecting the explosive charge is a pair of n-pole switches, each said pole pair corresponding to an explosive charge.

6. The apparatus of claim 1 further comprising a shock isolator mounted in the protective housing, and thereby protecting the current regulating means from damage caused by explosive forces generated by detonation of the plurality of explosive charges.

7. The apparatus of claim 1 further comprising a means for supporting the plurality of explosive charges.

8. The apparatus of claim 7 wherein the means for supporting the plurality of explosive charges comprises:
    a. cable connected at one end to the protective housing, whereby the cable extends below the protective housing and provides a means to support, attach, and space the plurality of charges; and
    b. a sinker weight connected at the opposing end of the cable from the protective housing whereby allowing the sinker weight to hang freely and fully extend the cable below the protective housing.

9. An apparatus for generating downhole seismic energy comprising:
    a) a current source for supplying electrical energy to fire an explosive charge;
    b) a means for determining the number of the explosive shot to be detonated;
    c) a means for selecting an explosive charge from a plurality of explosive charges;
    d) a means for regulating current flow to a plurality of explosive charges, such means being connected in a series electrical arrangement to the selecting means such that only one explosive is detonated at any one time;
    e) a cable to route current flow downhole, which cable contains a plurality of conductive paths, each path consisting of two wires, which cable is connected to said switching means so that only one of said plurality of conductive paths is used for the selection of said explosive charge from a plurality of explosive charges: one wire being used to send the signal to said charge and the other of the two said wires being sued to return the signal to close the circuit to the switching means;
    f) a plurality of explosive charges for generating a seismic signal connected in a series electrical arrangement to the current resulting means; and
    g) a protective housing in which the current regulating means is mounted.

10. The apparatus of claim 9 wherein the means for determining the number of explosive shots to be detonated and the means for selecting and firing an explosive charge is a pair of n-pole switches.

11. The apparatus of claim 9 wherein the means for regulating current flow is a transistor array.

12. The apparatus of claim 9 wherein the means for determining the number of the explosive shot to be detonated is a digital counter.

13. The apparatus of claim 9 wherein the means for regulating current flow is a diode array.

14. The apparatus of claim 9 wherein the means for regulating current flow is a combination of logic gates and relays connected in a manner such that only one explosive is fired at any given time.

15. The apparatus of claim 9 wherein the selecting means is a plurality of switches, each switch corresponding to an explosive charge.

16. The apparatus of claim 9 wherein the selecting means is a pair of n-pole switches, each said pole pair corresponding to an explosive charge.

17. The apparatus of claim 9 further comprising a means for supporting the plurality of explosive charges.

18. The apparatus of claim 17 wherein the means for supporting the plurality of explosive charges comprises:

a) a cable connected at one end to the protective housing, whereby the cable extends below the protective housing and provides a means to support, attach, and space the plurality of charges; and b) a sinker weight connected at the opposing end of the cable from the protective housing whereby allowing the sinker weight to hang freely and fully extend the cable below the protective housing.

19. The apparatus of claim 9 further comprising a shock isolator mounted in the protective housing, and thereby protecting the current regulating means from damage caused by explosive forces generated by detonation of the plurality of explosive charges.

* * * * *